United States Patent
Lu et al.

(10) Patent No.: US 10,093,837 B2
(45) Date of Patent: Oct. 9, 2018

(54) PROCESS FOR BINDING SUBSTRATES WITH A LIQUID OPTICALLY CLEAR PHOTO-CURABLE ADHESIVE

(71) Applicants: Henkel IP & Holding GmbH, Duesseldorf (DE); Henkel AG & Co. KGaA, Duesseldorf (DE)

(72) Inventors: Daoqiang Lu, Chandler, AZ (US); Masao Kanari, Kawasaki-shi (JP); Junichi Sawanobori, Kanagawa (JP)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 252 days.

(21) Appl. No.: 14/550,431

(22) Filed: Nov. 21, 2014

(65) Prior Publication Data

US 2015/0075698 A1   Mar. 19, 2015

Related U.S. Application Data

(63) Continuation of application No. PCT/CN2012/075894, filed on May 22, 2012.

(51) Int. Cl.

| *C09J 109/00* | (2006.01) |
|---|---|
| *C09J 5/00* | (2006.01) |
| *C09J 175/16* | (2006.01) |
| *C09J 133/14* | (2006.01) |
| *C09J 5/06* | (2006.01) |
| *C09J 4/06* | (2006.01) |
| *B29C 65/48* | (2006.01) |
| *B29C 65/00* | (2006.01) |
| *B29C 65/14* | (2006.01) |
| *B29L 31/34* | (2006.01) |

(52) U.S. Cl.
CPC .............. *C09J 109/00* (2013.01); *C09J 5/00* (2013.01); *C09J 5/06* (2013.01); *C09J 133/14* (2013.01); *C09J 175/16* (2013.01); *B29C 65/1406* (2013.01); *B29C 65/1409* (2013.01); *B29C 65/4845* (2013.01); *B29C 66/71* (2013.01); *B29C 66/91645* (2013.01); *B29L 2031/3475* (2013.01); *C09J 4/06* (2013.01); *C09J 2203/318* (2013.01); *C09J 2205/31* (2013.01); *C09J 2400/143* (2013.01); *C09J 2401/006* (2013.01); *C09J 2409/00* (2013.01); *C09J 2433/00* (2013.01); *C09J 2433/006* (2013.01); *C09J 2475/00* (2013.01); *G02F 2202/28* (2013.01); *Y10T 156/10* (2015.01)

(58) Field of Classification Search
None
See application file for complete search history.

(56) References Cited

U.S. PATENT DOCUMENTS

| 6,337,118 | B1 * | 1/2002 | Takehana | B32B 7/12 |
|---|---|---|---|---|
| | | | | 428/64.1 |
| 2009/0153756 | A1 * | 6/2009 | Roberts | C09K 19/408 |
| | | | | 349/35 |
| 2009/0160817 | A1 * | 6/2009 | Wu | G06F 3/044 |
| | | | | 345/173 |
| 2011/0092049 | A1 | 4/2011 | Chen et al. | |
| 2011/0201717 | A1 * | 8/2011 | Held | C09J 4/00 |
| | | | | 522/33 |
| 2012/0214896 | A1 * | 8/2012 | Igarashi | C08G 18/6216 |
| | | | | 522/96 |
| 2014/0163130 | A1 * | 6/2014 | Zhang | C09J 109/00 |
| | | | | 522/18 |
| 2015/0075710 | A1 * | 3/2015 | Lu | C09J 4/00 |
| | | | | 156/275.5 |
| 2015/0166860 | A1 * | 6/2015 | Yuan | C09J 175/16 |
| | | | | 156/275.5 |
| 2017/0253780 | A1 * | 9/2017 | Wang | C09J 175/16 |

FOREIGN PATENT DOCUMENTS

| CN | 101086952 A | 12/2007 | | |
|---|---|---|---|---|
| CN | 101614954 A | 12/2009 | | |
| JP | 2005308811 A | 11/2005 | | |
| WO | WO 2009086491 A1 * | 7/2009 | | C09J 4/00 |
| WO | 2013173977 A1 | 11/2013 | | |

OTHER PUBLICATIONS

Sachin Velankar et al., High-Performance UV-Curable Urethane Acrylates via Deblocking Chemistry, 1996, Journal of Applied Polymer Science, vol. 62, pp. 1361-1376.*

International Search Report issued in connection with International Patent Application No. PCT/CN2012/075894 dated Mar. 7, 2013.

* cited by examiner

Primary Examiner — Anish P Desai
(74) Attorney, Agent, or Firm — Steven C. Bauman

(57) ABSTRACT

A process for binding a top substrate to a base substrate is disclosed, in which
(a) a liquid optically clear photo-curable adhesive is applied onto the top side of the base substrate,
(b) the liquid optically clear photo-curable adhesive is partially cured by exposure to electromagnetic radiation comprising a wavelength ranging from 200 nm to 700 nm,
(c) the top substrate is attached on the partially cured adhesive layer of step (b),
(d) the adhesive is fully cured by exposure to electromagnetic radiation comprising a wavelength ranging from 200 nm to 700 nm.

20 Claims, No Drawings

PROCESS FOR BINDING SUBSTRATES WITH A LIQUID OPTICALLY CLEAR PHOTO-CURABLE ADHESIVE

The present disclosure relates to the bonding of substrates with a liquid optically clear photo-curable adhesive and it also relates to optical assemblies that include such optical clear adhesives. It further relates to a specific liquid optically clear photo-curable adhesive and to several uses of this adhesive.

Optically clear adhesives and especially liquid optically clear adhesives are finding wide applications in optical displays. Optical bonding in display applications is used to bond optical elements such as display panels, glass plates, touch panels, diffusers, rigid compensators, heaters, and flexible films such as polarizers and retarders. Especially the use of such adhesives for bonding in touch displays, for example, capacitive touch displays is of high interest. The importance of optically clear adhesives is still growing since the continuous development of new electronic display products, such as wireless reading devices, increases the demands for optically clear adhesives. But there are still some challenges to be mastered. A key problem for the adhesive is overflow control.

A method called "damming process" is an attempt to resolve this problem. This process consists of two steps. At first, the adhesive is applied to the edge of the required area by a dispensing nozzle followed be UV or LED curing. Second step is to fill the area inside the dam with a liquid optically clear adhesive. This process remains suboptimal because it needs two steps. Above that, boundary between dam and fill is always a challenge. Another possibility to overcome the problem of overflowing adhesive is the use of optically clear tapes. But this can easily lead to a reduced optical performance due to air gaps or bubbles which can reduce brightness and contrast of the display for example.

Thus, there is a need for a process for binding a top substrate, which preferably is a substantially transparent substrate, to a base substrate and also for a process of making an optical assembly which both overcome the problem of adhesive overflow.

This problem is solved by the subject matter of this invention, which is a process for binding a top substrate to a base substrate, in which (a) a liquid optically clear photo-curable adhesive is applied onto the top side of the base substrate, (b) the liquid optically clear photo-curable adhesive is partially cured by exposure to electromagnetic radiation comprising a wavelength ranging from 200 nm to 700 nm, preferably from 250 nm to 500 nm, (c) the top substrate is attached on the partially cured adhesive layer of step (b), (d) the adhesive is fully cured by exposure to electromagnetic radiation comprising a wavelength ranging from 200 nm to 700 nm, preferably from 250 nm to 500 nm.

The term "liquid optically clear photo-curable adhesive" is well established in the art and well known to the person skilled in the art. Liquid optically-clear adhesive (LOCA) is widely used in touch panels and display devices to bind the cover lens, plastic or other optical materials to the main sensor unit or to each other. Liquid optically-clear adhesives are generally used to improve the optical characteristics of the device as well as improve other attributes such as durability. The liquid optically clear photo-curable adhesive is generally used for example to bond the touch panel to the main liquid crystal display, and also to bond any protective cover, such as the lens, to the touch panel. Major applications of liquid optically clear photo-curable adhesive include capacitive touch panels, 3D televisions and glass retarders. In particular the adhesive is optically clear, if it exhibits an optical transmission of at least 85%. The measurement of optical transmission is known to the person skilled in the art. It can preferably be measured on a 100 μm thick sample according to the following preferred testing method.

Preferred Testing Method for Transmission:

A small drop of optically clear adhesive is placed on a 75 mm by 50 mm plain micro slide (a glass slide from Dow Corning, Midland, Mich.), that had been wiped three times with isopropanol and has two 100 μm thick spacer tapes attached on its two ends. A second glass slide is attached onto the adhesive under a force. Then the adhesive is fully cured under a UV source. The optical transmission is measured from wavelength 380 nm to 780 nm with a spectrometer Cary 300 from Agilent. One blank glass slide is used as the background.

An example of a liquid optically clear photo-curable adhesive, which works well with this invention, appears below.

The process of this invention leads to advantages over the state of the art, which are the avoidance of a damming process, a good edge controlling which means no overflow, a more precisely controlled adhesive thickness, a lower final curing shrinkage, which leads to lower internal stress in the display assembly, and also, a reliable adhesion to the top substrate, which is for example a transparent substrate or cover lens, and above that, no air gaps after lamination. Since the partially cured adhesive will not flow much, the final thickness of the adhesive layer can be controlled easily. Since the adhesive is already partially cured before the lamination, a possible shrinkage, which could occur during the final curing after lamination, is reduced.

The invention has further advantages as it is suitable for application on uneven surfaces, can be used in large panels, is ideal for filling in gaps, avoids condensation and fogging, permits resistance to extreme temperatures, allows very thin display designs. The assembly can easily be detached, repaired and adjusted preferably after partial curing step.

The "base substrate" in the context of this invention means the substrate, on which a top substrate will be attached to. The "base substrate" can be a display panel, for example, or a LCD. The optically clear photo-curable adhesive will be applied on the top side of the base substrate. The "top substrate" is for example a cover lens.

The application of the optically clear photo-curable adhesive in step (a) on the top side of the base substrate, which can be a display panel for example, can be done in the usual way, for example by a single or multi nozzle or a slit coater.

In step (a) a liquid optically clear photo-curable adhesive should be applied onto the top side of the base substrate such that preferably a 50 μm to 600 μm thick layer of a liquid optically clear adhesive results. Preferably, a continuous layer of the adhesive should be applied.

The partial curing in step (b) leads to a pre-gelled adhesive. This is the most critical step in the whole process. It is preferred that the liquid optically clear photo-curable adhesive is instantly pre-gelled by exposure to electromagnetic radiation comprising a wavelength ranging from 200 nm to 700 nm. "Instantly" means that the irradiation with electromagnetic radiation comprising a wavelength ranging from 200 nm to 700 nm should start within seconds after applying the adhesive on the base substrate, for example within 10 seconds or within 5 seconds or within 3 seconds after applying the adhesive. Thus, the pre-gelling starts before the adhesive will spread widely. The liquid optically clear photo-curable adhesive should be cured to a degree to build up enough viscosity so that it cannot overflow. But overcuring the liquid optically clear photo-curable adhesive at this step would affect the interfacial adhesion between the top substrate, which is added in step (c), for example a cover lens, and the adhesive and thus deteriorate the reliability performance.

UV-radiation can preferably be supplied using a high intensity continuously emitting system such as those available from Fusion UV Systems.

Therefore, controlling the curing degree during step (b) is critical. After the pre-gelling in step (c) the top substrate, which is preferably a substantially transparent substrate, is attached to the pre-gelled adhesive layer under ambient condition or under vacuum condition. Vacuum conditions are especially preferred to guarantee the best possible bubble-free bonding. If vacuum conditions are used, then the vacuum level should preferably be around <100 Pa, preferably <10 Pa. Finally the adhesive is fully cured by further exposure to electromagnetic radiation comprising a wavelength ranging from 200 nm to 700 nm, preferably from 250 nm to 500 nm.

As used herein, "substantially transparent" refers to a substrate that is suitable for optical applications, e.g., has at least 85% transmission over the range of from 380 nm to 780 nm.

In a preferred embodiment of the invention the viscosity of the partially cured adhesive (after completion of step (b)) is in the range of 10000 to 200000 mPa s, preferably 30000 to 150000 mPa s at 25° C. at a shear rate of 2.55 $s^{-1}$. Viscosity is preferably measured by HAAKE Rotational Rheometer with a cone plate (35 mm diameter).

The inventors found that this viscosity range is particularly advantageous so that on the one hand a very reliable bonding is ensured after full cure in step (d) and on the other hand an overflow of adhesive is prevented.

In another preferred embodiment of the invention the degree of cure of the liquid optically clear photo-curable adhesive after the pre-gelling step (b) is 20 to 95%, preferably 30 to 80%, in particular 50 to 70%. The inventors could find that such degree of cure ensures qualitatively especially good results in bonding properties after full cure in step (d) as well as efficient prevention of adhesive overflow. Also an excellent prevention of shrinkage is given, especially if the adhesive is already ≥50% cured before the lamination.

The measurement of the curing degree of adhesives is known to the skilled person and he is free to use any such known method.

According to the invention the curing degree can preferably be measured using a Fourier Transfer Infrared (FTIR) spectrometer with an ATR (attenuated total reflectance) fixture, such as Zinc Selenide crystal. The curing degree can be easily determined by measuring the decrease of the IR absorption at an absorption peak which is characteristic to the corresponding formulation chemistry, which is used. For example, IR absorption at 812 $cm^{-1}$ corresponds to the acrylate double bond, and can be used for measuring the curing degree of acrylate chemistry. This is well established and well known to the person skilled in the art.

An exemplary form of the detailed steps for measuring the curing degree of an acrylate based UV curable adhesive, which can preferably be applied, is given as follows:

First, the uncured adhesive is coated on the ATR fixture and then a FTIR spectrum around 812 $cm^{-1}$ is collected.

Second, the area ($A_0$) of this peak for the uncured adhesive is measured.

Third, the cured adhesive film is placed onto the ATR crystal surface.

Fourth, a FTIR spectrum around the same peak is collected, and the area of this peak ($A_1$) is measured.

Fifth, the curing degree can be calculated as follows:

Curing degree=$[(A_0-A_1)/A_0]*100$

The process of our invention can be used for any base substrate and any top substrate, which should be bonded together.

But according to a preferred embodiment of the invention the top side of the base substrate is selected from glass and polymer, preferably plastic films, including in particular polyethylene terephthalate, polymethyl (meth)acrylate, and/or triacetate cellulose (TAC). A plastic film is a thin sheet of (preferably polymer and preferably transparent) material used to cover things. A preferred base substrate is a LCD module with polarizer film on top. In a further preferred case the TAC is the top surface of the polarizer. So, in such case, the adhesive will be directly bonded to the TAC surface.

According to another preferred embodiment of the invention the side of the top substrate, which shall be bonded, which is preferably a transparent substrate, is selected from glass and polymer, preferably plastic films, including in particular polyethylene terephthalate, polymethyl (meth) acrylate, and/or TAC.

The base substrate can be a display panel, preferably selected from a liquid crystal display, a plasma display, a light-emitting diode (LED) display, an electrophoretic display, and a cathode ray tube display, according to another preferred embodiment of the invention.

It is especially preferred that the display panel has touch functionality.

According to another preferred embodiment the top substrate is selected from a reflector, cover lens, touch panel, retarder film, retarder glass, a LCD, a lenticular lens, a mirror, an anti-glare or anti-reflective film, an anti-splinter film, a diffuser, or an electromagnetic interference filter. For example for 3D TV applications, a glass or film retarder will be bonded onto a LCD for passive 3D TV, or a TN LCD or lenticular lens is bonded a regular TFT LCD for naked eye 3D.

The process of our invention can be used for any touch panel sensor assembly. It can preferably be used to bond touch panel sensors that require two layers of indium-tin-oxide coated glass. It can preferably be used for cover lens bonding, in particular to fill the air gap in touch panel sensors that utilize a cover lens (such as clear plastic polymethyl (meth)acrylate) and the glass touch panel sensor. It can preferably be used for direct bonding, preferably to directly bond the cover lens to a LCD module.

Of course our invention comprises the possibility that two or more top substrates are bonded one after another on a base substrate, for example starting with a LCD as the base substrate, then bonding one layer of indium-tin-oxide coated glass on the base substrate with help of the liquid optically clear photo-curable adhesive, after that bonding another layer of indium-tin-oxide coated glass on it with the help liquid optically clear photo-curable adhesive, after this bonding a cover lens on it with the help liquid optically clear photo-curable adhesive.

A preferred embodiment of our process for binding a top substrate to a base substrate is a process, in which (a) a liquid optically clear photo-curable adhesive is applied onto the top side of the base substrate, (b) the liquid optically clear photo-curable adhesive is partially cured by exposure to electromagnetic radiation comprising a wavelength ranging from 200 nm to 700 nm, preferably from 250 nm to 500 nm, such that the viscosity of the partially cured adhesive is in the range of 10000 to 200000 mPa s, preferably 30000 to 150000 mPa s at 25° C. at a shear rate of 2.55 sec$^{-1}$, and such that the degree of cure of the liquid optically clear photo-curable adhesive after the partial curing is 20 to 95%, preferably 30 to 80%, in particular 50 to 70%, (c) the top substrate is attached on the partially cured adhesive layer of step (b), (d) the adhesive is fully cured by exposure to electromagnetic radiation comprising a wavelength ranging from 200 nm to 700 nm, preferably from 250 nm to 500 nm, wherein the base substrate is a display panel and the top substrate is a reflector, cover lens, touch panel, retarder glass, retarder film, a lenticular lens, a mirror, an anti-glare or anti-reflective film, an anti-splinter film, a diffuser, an electromagnetic interference filter or a liquid crystal display.

Another subject matter of this invention is a process of making an optical assembly comprising:

(a) providing a display panel and a top substrate, (b) disposing a liquid optically clear photo-curable adhesive on the display panel, (c) partially curing the liquid optically clear photo-curable adhesive by exposing it to electromagnetic radiation comprising a wavelength ranging from 200 nm to 700 nm, preferably from 250 nm to 500 nm, (d) applying the top substrate on the partially cured adhesive layer of step (c), (e) exposing the optical assembly to electromagnetic radiation comprising a wavelength ranging from 200 nm to 700 nm, preferably from 250 nm to 500 nm to fully cure the adhesive.

It is preferred that step (c) is instantly done after step (b), which means that the exposure to electromagnetic radiation comprising a wavelength ranging from 200 nm to 700 nm, should happen within seconds after application of the liquid optically clear photo-curable adhesive on the display panel, in particular within 10 seconds or within 5 seconds or within 3 seconds after applying the adhesive.

In accordance with the above explanations it is again preferred that viscosity of the pre-gelled adhesive is in the range of 10000 to 200000 mPa s, preferably 30000 to 150000 mPa s at 25° C. at a shear rate of 2.55 s$^{-1}$. The viscosity should be measured in the same way as explained before.

Also in accordance with the above explanations it is again preferred that the degree of cure of the liquid optically clear photo-curable adhesive after the pre-gelling step (b) is 20 to 95%, preferably 30 to 80%, in particular 50 to 70%. The degree of cure should be determined in the same way as explained before.

A preferred embodiment of our process of making an optical assembly is a process comprising:

(a) providing a display panel and a top substrate, (b) disposing a liquid optically clear photo-curable adhesive on the display panel, (c) partially curing the liquid optically clear photo-curable adhesive by exposing it to electromagnetic radiation comprising a wavelength ranging from 200 nm to 700 nm, preferably from 250 nm to 500 nm, such that the viscosity of the partially cured adhesive is in the range of 10000 to 200000 mPa s, preferably 30000 to 150000 mPa s at 25° C. at a shear rate of 2.55 sec$^{-1}$, and such that the degree of cure of the liquid optically clear photo-curable adhesive after the partial curing step (c) is 20 to 95%, preferably 30 to 80%, in particular 50 to 70%.

(d) applying the top substrate on the partially cured adhesive layer of step (c), (e) exposing the optical assembly to electromagnetic radiation comprising a wavelength ranging from 200 nm to 700 nm, preferably from 250 nm to 500 nm to fully cure the adhesive.

Of course our invention always comprises the possibility that two or more top substrates are bonded one after another on a base substrate (e.g. display panel).

In both processes, which are the subject matter of this invention, a liquid optically clear photo-curable adhesive is applied. In principle, any liquid optically clear photo-curable adhesive can be applied. But the inventors found, that a special liquid optically clear photo-curable adhesive produces exceptional good results in the sense of our invention.

The preferred liquid optically clear photo-curable adhesive, which can be used according to our invention, comprises:

(a) 5 to 50 wt %, preferably 10 to 30 wt %, of an urethane acrylate, preferably an aliphatic polyether urethane acrylate or acrylic ester, (b) 10 to 80 wt %, preferably 30 to 70 wt %, of plasticizer, preferably chosen from polyisoprene resin, polybutadiene resin, terpene polymer resin, phthalates, trimellitates, adipates, benzoate ester, hexanoate and/or dicarboxylate, (c) 0.02 to 5 wt %, preferably 0.2 to 2 wt %, in particular 0.5 to 1.5 wt %, of photo initiator, preferably selected from 2,2-dimethoxy-1,2-diphenylethan-1-one, trimethylbenzoyl diphenylphosphine oxide, 1-hydroxycyclohexyl benzophenone, 2-methyl-1-[4-(methylthio)phenyl]-2-morpholinopropan-1-one and combinations therefore;

(d) 0 to 20 wt %, preferably 0.1 to 10 wt %, of a functional (meth)acrylate monomer, wherein the functional group preferably consists of hydroxyl, amide, carboxyl or a combination thereof, preferably selected from 2-hydroxyethyl (meth) acrylate, 3-hydroxypropyl (meth)acrylate, 2-hydroxybutyl (meth)acrylate, 4-hydroxybutyl (meth)acrylate, octyl acrylamide, acrylic acid and combinations thereof, (e) 0 to 50 wt %, preferably 0.1 to 45 wt %, in particular 5 to 40 wt %, of (meth)acrylate monomers and/or oligomer.

The urethane acrylate is preferably an aliphatic polyether urethane acrylate or acrylic ester. The urethane acrylate should preferably have a $T_g$ value from −80° C. to −10° C., in particular carry a UV-curable group of alkyl(meth)acrylate, and preferably should have a viscosity ranging from 5,000 to 500,000 mPa at 25° C. at a shear rate of 2.55 s$^{-1}$, measurable by HAAKE Rotational Rheometer with a cone plate (35 mm diameter).

$T_g$ is the glass transition temperature. The $T_g$ can preferably be determined by differential scanning calorimetry (DSC). This technique is well known to the person skilled in the art. In a preferred embodiment the glass transition temperature is determined by DSC at a heating rate of 10° C./min.

The urethane acrylate preferably comprises multifunctional polyether (meth)acrylate oligomer. The multifunctional polyether (meth)acrylate oligomer comprise at least two (meth)acrylate groups, e.g., from 2 to 4 (meth)acrylate groups. Difunctional aliphatic urethane acrylate oligomers are preferred.

For example, the multifunctional urethane acrylate oligomer may be formed from an aliphatic polyester or polyether polyol prepared from condensation of a dicarboxylic acid, e.g., adipic acid or maleic acid, and an aliphatic diol, e.g. diethylene glycol or 1,6-hexane diol. In one embodiment, the polyester polyol may comprise adipic acid and diethylene glycol. The multifunctional isocyanate may comprise methylene dicyclohexylisocyanate or 1,6-hexamethylene diisocyanate. The hydroxy-functionalized acrylate may comprise a hydroxyalkyl acrylate such as 2-hydroxyethyl acrylate, 2-hydroxypropyl acrylate, 4-hydroxybutyl acrylate, or polyethylene glycol acrylate. In one embodiment, the multifunctional urethane acrylate oligomer may comprise the reaction product of a polyester polyol, methylene dicyclohexylisocyanate, and hydroxyethyl acrylate.

Suitable urethane acrylates, which can be used according to this invention, are for example aliphatic polyether urethane diacrylates, in particular BR-3042, BR-3641 AA, BR-3741 AB, and BR-344 available from Bomar Specialties Co., Torrington, Conn.

Other preferred aliphatic urethane acrylate are for example CN-9002, CN9014 NS, CN-980, CN-981, CN-9019 available from Sartomer Company Inc, Exton, Pa. Urethane acrylate resins such as Genomer 4188/EHA, Genomer 4269/M22, Genomer 4425, and Genomer 1122, Genomer 6043 from Rahn AG, Switzerland are also preferred. Aliphatic urethane acrylates like UV-36301D80, UV-NS054, and UV-NS077 from Nippon Soda, Tokyo, Japan are also preferred. Difunctional aliphatic polyester urethane acrylate oligomer as well as difunctional aliphatic polyester/ether urethane acrylate oligomer are preferred urethane acrylates, too.

Suitable examples of ingredient (e) include methyl (meth)acrylate, ethyl (meth)acrylate, monoacrylate oligomer, monoacrylate oligomer with urea structure, 2(2-ethoxyethoxy) ethyl acrylate, tetrahydrofurfury acrylate, lauryl acrylate, benzyl acrylate, isooctyl acrylate, isodecyl acrylate, 2-ethylhexyl acrylate, 2-phenoxyethyl acrylate, isobornyl (meth)acrylate, dicyclopentenyloxyethyl methacrylate, dicyclopentadienyl methacrylate and combinations thereof. The (meth)acrylate oligomer should preferably have a $T_g$ value from $-80°$ C. to $100°$ C. The oligomer can preferably be made from (meth)acrylic monomers and can preferably have a weight average molecular weight (Mw) within the range of about 1000 to 15000. A preferred weight average molecular weight (Mw) can be around 2000. Mw can be determined by GPC In general, (meth)acrylate refers to both acrylate and methacrylate functionality. In general, "acrylate" refers to both acrylate and methacrylate functionality. "Acrylic ester" refers to both acrylic ester and methacrylic ester functionality.

Preferred polyisoprene resin and/or, polybutadiene resin, which can be used in this invention are for example Polybutadiene Polybd45CT, Polybd2000CT, Polybd3000CT, CN307 available from Sartomer Company Inc, Exton, Pa. Polyisoprene LIR-30, LIR-50, LIR-290 available from Kuraray Co. Ltd, Tokyo, Japan. Polybutadiene TEA-1000, TE2000, GI-1000, GI-2000, GI-3000, BI-2000, BI-3000, JP-100, available from Nippon Soda Co Ltd, Tokyo, Japan. BI-2000, for example, is a hydrogenated 1,2-polybutadiene homopolymer with a number average molecular weight of around 2100. GI-2000, for example, is a hydroxy-terminated hydrogenated 1,2-polybutadiene, with a number average molecular weight of around 2100.

Other preferred plasticizers for example include Palatinol 810P, Palatinol DPHP, Plastomoll DNA from BASF Corporation, NJ, USA, and Admex 523 Polymeric Plasticizer, Admex 6996 Polymeric Plasticizer, TEG-EH plasticizer (Triethylene Glycol Bis (2-EthylHexanoate)), DOP plasticizer (Bis(2-Ethylhexyl) Phthalate) from Eastman Chemical Company, TN, USA.

Of course, other plasticizers, which are available on the market, can also be used as plasticizers.

This specific liquid optically clear photo-curable adhesive is also another subject matter of this invention. Above that, the use of said liquid optically clear photo-curable adhesive for bonding parts of optical assemblies is another subject matter of this invention.

The use of said liquid optically clear photo-curable adhesive for touch panel sensor assembly, preferably to bond touch panel sensors that require two layers of ITO (indium-tin-oxide) coated glass is another subject matter of this invention. The use of said liquid optically clear photo-curable adhesive for cover lens bonding, preferably to fill the air gap in touch panel sensors that utilize a cover lens and the glass touch panel sensor is another subject matter of this invention. The use of said liquid optically clear photo-curable adhesive for directly bonding the cover lens to a LCD module is another subject matter of this invention.

The preferred liquid optically clear photo-curable adhesive can also comprise a tackifier. Tackifiers are well known and are used to increase the tack or other properties of an adhesive. There are many different types of tackifiers but nearly any tackifier can be classified as a rosin resin derived from wood rosin, gum rosin or tall oil rosin; a hydrocarbon resin made from a petroleum based feedstock; or a terpene resin derived from terpene feedstocks of wood or certain fruits. The adhesive may comprise, e.g., from 0.001 wt % to about 20 wt %, from 0.01 wt % to about 15 wt %, or from 0.1 wt % to about 10 wt % of tackifier. The adhesive layer may also be substantially free of tackifier comprising, e.g., from 0.001 wt % to about 5 wt % or from about 0.001 wt % to about 0.5 wt % of tackifier all relative to the total weight of the adhesive. The adhesive may also be completely free of tackifier.

The preferred liquid optically clear photo-curable adhesive can of course comprise further ingredients. Preferably, liquid optically clear photo-curable adhesive further comprises an adhesion promoter, an antioxidant, a surfactant or a combination thereof.

Our invention is applicable in all fields of mobile phone, tablet PC, TV, notebook PC, digital camera, photo frame, car navigation, outdoor display etc.

EXAMPLE

The following liquid optically clear photo-curable adhesive was prepared by mixing all ingredients to obtain a homogeneous mixture away from light.

| | |
|---|---|
| CN9014NS | 15 wt % |
| (Urethane Acrylate Oligomer, ex Sartomer Company, Inc.) | |
| Lauryl acrylate | 19 wt % |
| Isobornyl acrylate | 6 wt % |
| 2-Hydroxyethyl methyacrylate | 3 wt % |
| BI-2000 | 56 wt % |
| (Hydrogenated polybutadiene from Nippon Soda Co. Ltd) | |
| Speedcure TPO | 0.3 wt % |
| (2,4,6-Trimethylbenzoyl diphenyl phosphine oxide) | |
| Irgacure 184D | 0.7 wt % |
| (1-Hydroxycyclohexyl phenyl ketone) | |

This liquid optically clear photo-curable adhesive was used in a process of making an optical assembly comprising:
(a) providing a LCD module and a cover lens,
(b) disposing the liquid optically clear photo-curable adhesive on the LCD module,
(c) partially curing the liquid optically clear photo-curable adhesive by instantly exposing it to electromagnetic radiation comprising a wavelength ranging from 200 nm to 700 nm, such that the degree of cure of the liquid optically clear photo-curable adhesive after the partial curing was around 55%, measured using the Fourier Transfer Infrared (FTIR) spectrometer method as described above, (d) applying the cover lens on the partially cured adhesive layer of step (c), (e) exposing the optical assembly to electromagnetic radiation comprising a wavelength ranging from 200 nm to 700 nm to fully cure the adhesive.

The inventive process with the specific adhesive allowed the avoidance of a damming process, a precisely controllable adhesive thickness, an avoidance of final curing shrinkage, as far as possible. There were no problems with adhesive overflow at all, and no air gaps after lamination could be detected.

What is claimed is:

1. A liquid optically clear photo-curable adhesive, which consists of:
   (a) 5 to 50 wt % of an aliphatic polyether urethane acrylate having a glass transition temperature in a range of from −80 to −10° C. and a viscosity in a range of from 5,000 to 500,000 mPa at 25° C. at a shear rate of 2.55 sec$^{-1}$,
   (b) 10 to 80 wt % of a plasticizer selected from the group consisting of polyisoprene resin and polybutadiene resin,
   (c) 0.02 to 5 wt % of a photo initiator selected from the group consisting of 2,2-dimethoxy-1,2-diphenylethan-1-one, trimethylbenzoyl diphenylphosphine oxide, 1-hydroxycyclohexyl benzophenone, 2-methyl-1-[4-(methylthio)phenyl]-2-morpholinopropan-1-one, and combinations thereof;
   (d) 0.1 to 10 wt % of a functional group containing (meth)acrylate monomer, wherein the functional group on the (meth)acrylate monomer is hydroxyl, amide, carboxyl, or a combination thereof, and
   (e) 0.1 to 45 wt % of a (meth)acrylate monomer and/or oligomer, the oligomer having a glass transition temperature in a range of from −80 to 100° C. and a weight average molecular weight in a range from 1,000 to 15,000.

2. An optical assembly comprising a cured reaction product of the liquid optically clear photo-curable adhesive of claim 1.

3. A touch panel sensor assembly comprising a cured reaction product of the liquid optically clear photo-curable adhesive of claim 1.

4. A touch panel sensor comprising a cured reaction product of the liquid optically clear photo-curable adhesive of claim 1 in an air gap therein.

5. A cover lens bonded to a LCD module by a cured reaction product of the liquid optically clear photo-curable adhesive of claim 1.

6. The liquid optically clear photo-curable adhesive of claim 1, wherein the functional group containing (meth) acrylate monomer selected from the group consisting of 2-hydroxyethyl (meth)acrylate, 3-hydroxypropyl (meth) acrylate, 4-hydroxybutyl (meth)acrylate, 2-hydroxybutyl (meth)acrylate, and combinations thereof.

7. The liquid optically clear photo-curable adhesive of claim 1, wherein the functional group containing (meth) acrylate monomer is present in an amount of 3 wt %.

8. The liquid optically clear photo-curable adhesive of claim 1, wherein the (meth)acrylate oligomer is present in an amount of 5 to 40 wt %.

9. A liquid optically clear photo-curable adhesive, which consists of:
   (a) 10 to 30 wt % of an aliphatic polyether urethane acrylate having a glass transition temperature in a range of from −80 to −10° C. and a viscosity in a range of from 5,000 to 500,000 mPa at 25° C. at a shear rate of 2.55 sec$^{-1}$;
   (b) 30 to 70 wt % of a plasticizer;
   (c) 0.5 to 1.5 wt % of a photo initiator;
   (d) 0.1 to 10 wt % of a functional group-containing (meth)acrylate monomer; and
   (e) 5 to 40 wt % of a (meth)acrylate monomer and/or oligomer, the oligomer having a glass transition temperature in a range of from −80 to 100° C. and a weight average molecular weight in a range from 1,000 to 15,000.

10. A process for binding a top substrate to a base substrate, comprising:
    (i) applying the liquid optically clear photo-curable adhesive of claim 1 onto the top side of the base substrate,
    (ii) partially curing the liquid optically clear photo-curable adhesive by exposure to electromagnetic radiation comprising a wavelength in a range of from 200 nm to 700 nm,
    (iii) attaching the top substrate to the partially cured adhesive layer of step (ii), and
    (iv) fully curing the adhesive by exposure to electromagnetic radiation comprising a wavelength in a range of from 200 nm to 700 nm.

11. The process according to claim 10, wherein the viscosity of the partially cured adhesive is in the range of from 10000 to 200000 mPa s at 25° C. at a shear rate of 2.55 sec$^{-1}$.

12. The process according to claim 10, wherein the degree of cure of the liquid optically clear photo-curable adhesive after the partial curing step (ii) is 20 to 95%.

13. The process according to claim 10, wherein the top side of the base substrate is glass or polymer.

14. The process according to claim 10, wherein the side of the top substrate is glass or polymer.

15. The process according to claim 10, wherein the top substrate is a reflector, a cover lens, a touch panel, a retarder glass, a retarder film, a lenticular lens, a mirror, an anti-glare or anti-reflective film, an anti-splinter film, a diffuser, an electromagnetic interference filter, or a liquid crystal display.

16. The process according to claim 10, wherein the base substrate is a display panel.

17. The process according to claim 16, wherein the display panel has touch functionality.

18. A process of making an optical assembly comprising:
    (i) disposing the liquid optically clear photo-curable adhesive of claim 1 on a display panel,
    (ii) partially curing the liquid optically clear photo-curable adhesive by exposing it to electromagnetic radiation comprising a wavelength in a range of from 200 nm to 700 nm,
    (iii) applying a top substrate on the partially cured adhesive layer of step (ii), and
    (iv) exposing the optical assembly to electromagnetic radiation comprising a wavelength in a range of from 200 nm to 700 nm to fully cure the adhesive.

19. The process according to claim 18, wherein the viscosity of the partially cured adhesive is in a range of 10000 to 200000 mPa s at 25° C. at a shear rate of 2.55 sec$^{-1}$.

20. The process according to claim 18, wherein the degree of cure of the liquid optically clear photo-curable adhesive after the partial curing step (ii) is 20 to 95%.

* * * * *

UNITED STATES PATENT AND TRADEMARK OFFICE
CERTIFICATE OF CORRECTION

PATENT NO. : 10,093,837 B2
APPLICATION NO. : 14/550431
DATED : October 9, 2018
INVENTOR(S) : Daoqiang Lu, Masao Kanari and Junichi Sawanobori It is certified that error appears in the above-identified patent and that said Letters Patent is hereby corrected as shown below:

In the Specification

Column 1, Line 28, change "be" to "by"

Column 7, Line 20, change "UV-36301D80" to "UV-3630ID80"

Signed and Sealed this
Ninth Day of July, 2019

Andrei Iancu
*Director of the United States Patent and Trademark Office*